May 31, 1949.  W. R. HORNE  2,471,748
ANIMAL TRAP
Filed Nov. 26, 1946  2 Sheets-Sheet 1
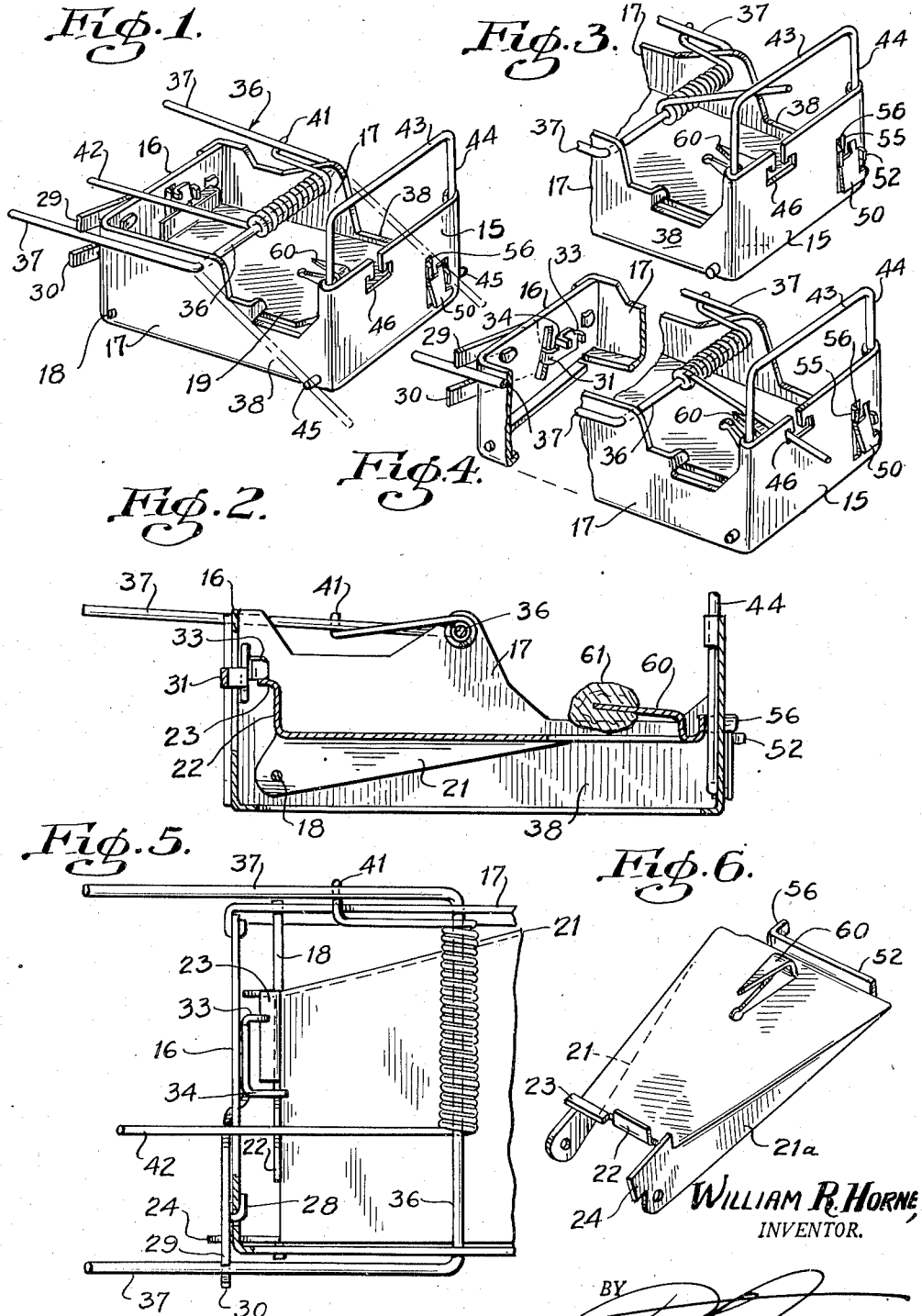
WILLIAM R. HORNE,
INVENTOR.
BY 
ATTORNEY.

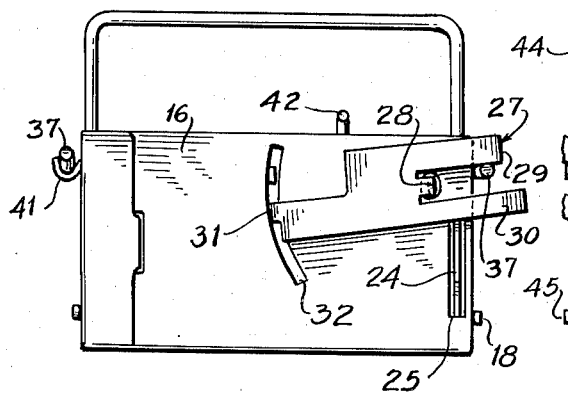
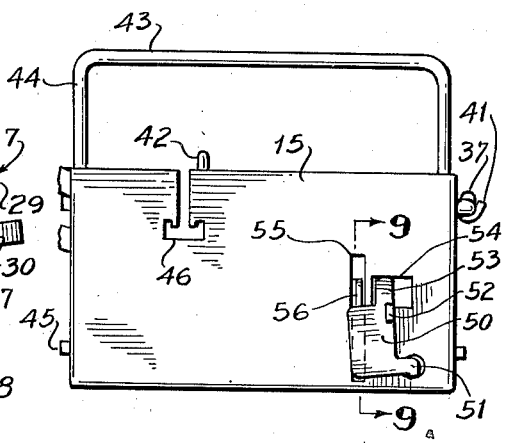
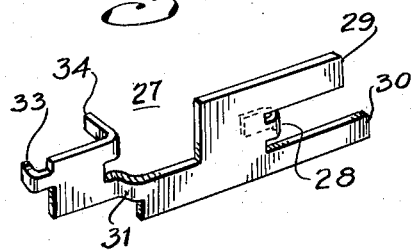
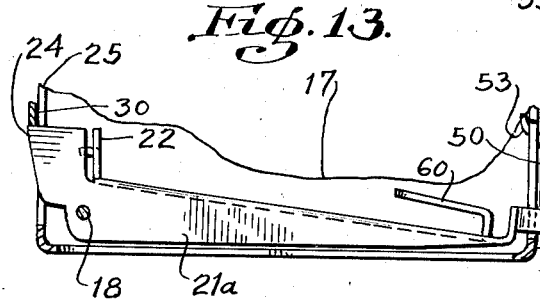
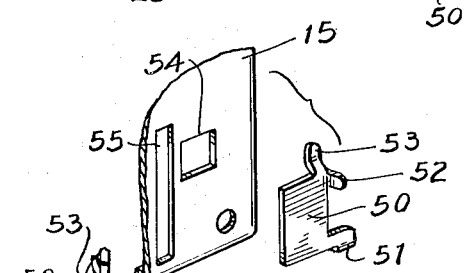

Patented May 31, 1949

2,471,748

UNITED STATES PATENT OFFICE 2,471,748

ANIMAL TRAP

William R. Horne, Los Angeles, Calif.

Application November 26, 1946, Serial No. 712,439

19 Claims. (Cl. 43—81.5)

This invention relates to an animal trap.

Among the objects of the invention are; to provide a simplified approximately U-shaped swingable, spring loaded striker member to pin down the entrapped animals; to provide improved means for adjusting the tension of the spring wherewith said striker is loaded; to provide improved means for locking said striker in its set position; to provide an improved safety latch for the striker, said latch automatically setting itself so as more efficiently to protect the person setting the trap from being injured by the premature release of the striker; to provide an arrangement of upstanding frame side walls combined in a superior manner with downswingable striker arms so that when said striker arms are released by the trigger of the trap they will cooperate in a scissors-like manner with said upstanding walls to grip the entrapped animal; and to improve upon and simplify various structural details.

Other objects, advantages and features of invention will hereinafter appear.

Referring to the accompanying drawings, which illustrate a preferred embodiment of the invention, Fig. 1 is a perspective view of the complete trap showing the same in the set position, the safety latch being shown in its operative position.

Fig. 2 is a longitudinal vertical midsection of the complete trap in the position thereof wherein the pair of striker arms are shown in the retracted, set position.

Fig. 3 is a fragmentary perspective of the front end portion of the trap with the striker arms set and the safety latch at a front corner portion of the trap gravitated to its operative position.

Fig. 4 is a perspective view with the safety latch positioned as in Fig. 3, and the striker arms in set position. In this view parts are broken away in order to disclose the interior part of the striker-release member mounted upon the rear end portion of the trap.

Fig. 5 is a fragmentary plan view of the rear portion of the trap adjusted as in Fig. 1.

Fig. 6 is a perspective view of the bait-carrying trigger plate.

Fig. 7 is a rear end elevation of the trap with the striker in the set position.

Fig. 8 is a front end elevation of the trap with the striker in set position.

Fig. 9 is a sectional detail taken on line 9—9 of Fig. 8.

Fig. 10 is a reproduction of the lower right hand part of Fig. 8, differing from the latter view only in that the safety latch is shown in its inoperative position.

Fig. 11 is a fragmental perspective showing, adjacent to each other, the safety latch plate and the part of the casing of the trap in which it is mounted in a floating manner.

Fig. 12 is a perspective view, on a larger scale than any of the other views, of the striker-release member, separately shown.

Fig. 13 is a fragmental, longitudinal vertical section taken just behind the side wall of the trap's casing nearest to the observer, the front end of the trap being to the right, the trigger plate being shown completely depressed, hence below the level of the safety latch.

Figs. 1, 3 and 4 of the drawings are on a smaller scale than the remaining views.

In Figs. 1, 2 and 5 the tension regulating arm of the striker-actuating spring is shown adjusted for the lowest tension of the spring; in Fig. 3 said arm is shown adjusted for medium tension; and in Fig. 4 said arm is shown adjusted for the highest tension.

Referring in detail to the drawings, a sheet metal open topped trap frame is shown comprising an upstanding front end wall 15, upstanding rear wall, 16, and twin side walls 17. Within the lower part of the front portion of said frame is a horizontal pivot pin 18 for the trigger plate 19, said plate being shown with depending reinforcing flanges 21, 21a which widen toward the rear end of the trap, that edge of the trigger plate along which the flange 21 extends being shown beveled in Fig. 5. Said pivot pin extends through the widened portions of said flanges. Superjacent to said pin the trigger plate carries an upstanding rear end flange 22 which extends across the greater part of the width of the plate, said upstanding flange being approximately vertical above said pivot pin when the trigger plate is in its set position. One end portion of the latter flange carries at its upper edge a rearwardly directed lip 23. As to the rear part of the trigger plate it only remains to be said that its flange 21a carries a rearward extension 24 which projects loosely through a vertical slot 25 in a lower corner portion of the rear wall 16 of the trap's frame.

A latch member 27 is pivoted to the upper corner portion of the rear end wall 16 superjacent to said slot 25. Said latch member is shown as a strap metal plate which in a flatwise manner abuts the rear face of the wall 16 and which has a forwardly bent, laterally deflected pivot tongue 28 extending through an opening in the wall 16 so as to mount the latch plate to rock vertically in an edgewise manner. Said tongue 28 is struck out of the metal in such a way as to recess the adjacent end of the latch and produce a bifurcation comprising an upper arm 29 and slightly longer lower arm 30. Said lower arm at times engages and depresses the aforesaid trigger plate extension 24 to swing the trigger up to set position.

Near the end thereof opposite to its bifurcation the latch plate 27 is forwardly offset at 31 so as to pass through an opening 32 in the rear wall 16, the plate beyond said offset being expanded in an edgewise manner and provided at its end with an outer forwardly directed ear 33 and not quite so far from its end with a like ear or finger 34 somewhat longer than said ear 33. Said ear 33 is engageable at times with the upper face of the aforesaid lip 23, but the finger 34 can engage only the rear face of the flange 22, which it contacts in a horizontally spaced relation to said lip.

A spring loaded striker is provided to pin down the entrapped animals, said striker comprising a rectangularly U-shaped rod 36 and carrying at its ends the twin striker arms 37. The trap's side walls 17 have low-lying front portions 38, and since said striker arms 17 swing in vertical planes exteriorly adjacent to said side walls and are directed forwardly of the trap when in their downswung position, they cooperate in a scissors-like manner with said low-lying wall portions not only to strike but also to grip the body of the entrapped animals.

The basal run 36 of the U-shaped striker spans the space between and has its bearings in the upper part of the trap's side walls. Around said runs 36 is coiled the striker-actuating spring having at one end a radial arm 41 the free end portion of which is hooked to one of the striker arms 37, the opposite end of the spring having a radial anchoring or tensioning arm 42 shown in Fig. 1 as resting upon the top of the rear wall 16, but shown in Fig. 3 as underlying the horizontal top run 43 of a rod 44 bent to an inverted U-shape and used to reinforce the front corner portions of the trap's frame, said rod 44 being shown having feet 45 which project outwardly through the side walls 17 and afford rests for the sprung striker. In Fig. 4 said striker arm 42 is shown underlying one of the shoulders of a two-shouldered inverted T-slot 46 cut downwardly into the upper edge portion of the front wall 15. Hence it will be seen that a low, high and medium tensioning is provided for the striker-actuating spring.

Mounted upon the front end wall 15 of the trap is shown an automatically acting manually releasable safety latch 50 consisting of a clip disposed externally of said wall and having at one of its lower corners a pivot ear 51 extending loosely through a hole provided for it through said wall and having at its upper end a manually grippable operating ear 52. Adjacent to the latter ear the clip has a stop ear 53 projecting through a slot 54 in the wall and aiding in keeping the clip in place. Through an adjacent part of said wall is provided a vertical slot 55 along which loosely moves a forwardly projecting ear extension 56 of the trigger plate, said extension being shown as a deflected part of one end portion of an upstanding flange 52 formed as an upward deflection of the front edge portion of the trigger plate. The safety latch plate is so positioned that one of its upper corners will automatically gravitate to an underlying locking relation to said trigger plate extension 56 when the front end of said trigger plate is upraised. This front part of the trigger plate is provided at its midwidth with an upwardly offset rearwardly directed bait holding spur 60. The trigger plate should be so dimensioned when used for catching mice, that the mouse will have to press thereupon with its front feet in reaching the bait, designated 61 in Fig. 2.

The operation of the device will for the most part be readily understood from the foregoing description, but to insure a complete understanding thereof a brief description will now be given of the coaction between the trigger plate, bifurcated latch member and striker arm which cooperates with said latch member as the striker arms approach the set position.

In setting the trap, when the striker arm which moves the lower latch member arm 30 begins to engage the latter the trigger plate is still unset with its front end down and the top part and lip 23 of its rear flange 22 forwardly positioned. Then a continued downswing of the striker arm, after it contacts said arm 30, depresses the bifurcated part of the latch plate swinging upwardly its opposite end until its outer ear or finger 33 is on a level with (or slightly above) the rearwardly directed lip 23 of the trigger flange 22. Thereupon a continued downswing of the striker arm will bring the lower edge of the lower arm 30 of the latch arm into engagement with the rearward extension 24 of the trigger plate (see Figs. 5 and 7) thereby tilting the trigger plate to a position wherein its aforesaid lip 23 is vertically subjacent to the latch arm finger 33, and also allowing the safety latch 50 at the opposite end of the trap to gravitate under the trigger plate extension 56 so that, when the operator releases the striker arm it will be locked in the set position by the bifurcation arm 29, which at such time cannot swing upwardly owing to downswing of the opposite end of the latch member being prevented by the trigger lip 23. To complete the setting of the trap the operator must now swing the safety latch 50 to its inoperative position shown in Fig. 3, in which position it will remain because, as shown in this view the trigger plate extension 56 will spring down slightly below the stop shoulder portion of the safety latch keeping it from gravitating to its locking position. The operativeness of the trap is not dependent upon using the safety latch, but if it is absent the operator must, while he sets the striker with one hand, use his other hand to prevent the premature downswing of the trigger plate.

It will be observed that when the operator swings the safety latch plate from the latching position of Fig. 8 to its released position, the shoulder portion of said plate, which underlies the trigger plate extension 56, will rise as well as move laterally thus slightly springing upwardly the front end portion of the trigger plate until said shoulder clears the extension 56. Thereupon said extension 56 will spring slightly downwardly moving alongside of said latch plate to maintain the latter in the retracted position.

I claim:

1. A trap comprising a frame, a trigger mounted on said frame and releasable by an animal to be trapped, a spring-actuated striker consisting of a U-shaped rod having its basal portion pivoted to said frame, and latching means positioned releasably to hold said striker in its set position, said latching means being operatively connected to said trigger.

2. A trap comprising a frame having side portions, a trigger pivoted to said frame and releasable by an animal to be trapped, a striker consisting of a U-shaped rod having its basal portion pivoted to said frame side portions and bridging the space between them, an actuating spring for said striker, a portion of said spring being coiled around the basal run of said U-shaped rod, and latching means releasably to hold said striker in its set position, said latching means being operatively connected with said trigger.

3. A trap comprising a frame, a baitable trigger mounted upon said frame and releasable by an animal to be trapped, a spring loaded striker consisting of a rectangularly U-shaped rod having its basal portion pivoted to said frame, said frame having low-lying opposite side portions to unobstruct the path of an animal to bait carried by said trigger, and latching means releasably to hold said striker in set position, said latching means being operatively connected to said trigger, the arms of said U-shaped striker, when the latter is released from set position, swinging downwardly along paths externally adjacent to said side portions of said frame.

4. The subject matter of claim 3, and said low-lying frame side portions consisting of plates having upper edge portions that cooperate with said arms of the striker to produce a scissors-like action upon the trapped animal.

5. A trap comprising a frame, a trigger mounted on said frame and releasable by an animal to be trapped, a striker pivoted to said frame, a spring operatively connected with said striker, said spring consisting of a wire having a coiled body portion under tension and arms extending outwardly from its coiled portion, one of its arms engaging said striker, means carried by said frame to anchor the other arm of said spring in different positions in relation to the coiled part of the spring thus to regulate the tension of the latter, and latching means releasably to hold said striker in its set position, said latching means being operatively connected to said trigger.

6. The subject matter of claim 5 and said anchor means for the anchored arm of said spring including a bar of an inverted U-shape carried by said frame, said bar having a top run positioned for having the end portion of the spring arm to be anchored swung laterally under it.

7. The subject matter of claim 5, and said anchor means for the anchored arm of said spring including an upstanding plate carried by said frame having an upper edge portion cut to form a downwardly facing shoulder under which said anchored arm is positionable.

8. A trap comprising a frame, a trigger mounted on said frame and releasable by an animal to be trapped, a striker pivoted to said frame, a spring operatively connected with said striker, said spring consisting of a wire having a coiled body portion under tension and arms extending outwardly from its coiled portion, one of its arms engaging said striker, means carried by said frame to anchor the other arm of said spring in two different positions in relation to the coiled part of the spring thus to regulate the tension of the latter, and latching means releasably to hold said striker in its set position, said latching means being operatively connected to said trigger.

9. A trap comprising a frame, a trigger mounted on said frame and releasable by an animal to be trapped, a striker pivoted to said frame, a spring operatively connected with said striker, latching means for said striker releasably to hold it in the set position, said latching means being operatively connected with said trigger, and a manually operable safety catch mounted upon said frame and arranged automatically to gravitate to a position to hold said trigger in an inoperative position, said frame having an upstanding plate portion through which a part of said trigger projects and said safety catch consisting of a clip pivoted to said upstanding plate.

10. A trap comprising a frame of an open-topped character and having upstanding front end, rear end, and side walls, a trigger plate disposed horizontally within the lower part of said frame, the rear end portion of said trigger plate being pivotally mounted on said frame and having an upstanding flange with a rearwardly directed lip above the pivoted mounting of said plate, a latch member pivoted between its ends to said rear wall of said frame to swing in a vertical plane, said trigger plate having a projection rearward of its pivotal mounting in the path of the downswing of one end portion of said latch member so that said member at times moves said trigger plate to its set position, that end portion of said latch member which moves said trigger plate being bifurcated providing it with an upper and a lower arm, and a spring loaded striker swingably connected to said frame and which during its swing to set position against the opposition of its spring bears down upon the lower arm of said bifurcation thus swinging upwardly the end of said latch member opposite to its bifurcation, the latter end of said latch member having a latching extension to overlie the aforesaid lip thus to cause the trigger plate releasably to hold said latch member against backswing, the part of said striker which actuates said latch member being at such time in an underlying relation to the upper arm of the aforesaid bifurcation so that such arm locks the striker in its set position by reason of downswing of the opposite end portion of said latch member being prevented by the aforesaid lip of the trigger plate.

11. A trap comprising a frame of an open-topped character and having upstanding front end, rear end, and side portions, a trigger plate disposed horizontally within the lower part of said frame, the rear end portion of said trigger plate being pivotally mounted on said frame and having an upstanding flange the upper portion of which is located approximately vertically above the pivotal mounting of said plate when said plate is in the set position, a latch member pivoted between its ends to the rear part of said frame to swing in a substantially vertical plane, said trigger plate having a projection rearward of its pivotal mounting in the path of the downswing of one end portion of said latch member so that said member at times moves said trigger plate to its set position, that end portion of said latch member which moves said trigger plate being bifurcated providing it with an upper and a lower arm, and a spring loaded striker swingably connected to said frame and which during its swing to set position against the opposition of its spring bears down upon the lower arm of said bifurcation thus swinging upwardly the end of said latch member opposite to its bifurcation, the latter end of said latch member having a latching extension to overlie the aforesaid upstanding flange of the trigger plate, thus to cause the trigger plate releasably to hold said latch member against backswing, the part of said striker which actuates said latch member being at such time in an underlying relation to the upper arm of the aforesaid bifurcation so that such arm locks the striker in its set position by reason of the downswing of the opposite end of said latch member being prevented by the aforesaid upstanding flange of said trigger plate.

12. A trap comprising a frame, a trigger plate mounted in the lower part of said frame to tilt vertically, the rear end portion of said trigger plate being pivotally mounted on said frame and having an upstanding flange with a rearwardly directed lip normally approximately vertically above the pivotal mounting of said plate, a latch member pivoted between its ends to the rear part of said frame to swing in a vertical plane, said trigger plate having a projection rearward of its pivotal mounting in the path of the downswing of one end portion of said latch member so that said member at times moves said trigger plate to its set position, that end portion of said latch member which moves said trigger plate being bifurcated providing it with an upper and a lower arm, and a spring loaded striker swingably connected to said frame and which during its swing to set position against the opposition of its spring bears down upon the lower arm of said bifurcation thus swinging upwardly the end of said latch member opposite to its bifurcation, the latter end of said latch member having a latching extension to overlie the aforesaid lip, thus to cause the trigger plate releasably to hold said latch member against backswing, the part of said striker which actuates said latch member being at such time in an underlying relation to the upper arm of the aforesaid bifurcation so that such arm locks the striker in its set position by reason of downswing of the opposite end of said latch member being prevented by the aforesaid trigger plate, a part of said latch member during the setting of the trap moving upwardly across the rear surface of said upstanding flange to prevent premature upswing of said trigger plate.

13. The subject matter of claim 12, and said striker comprising arms positioned to swing in vertical planes exteriorly adjacent to the side portions of the frame, one of said arms cooperating with the bifurcation of said latch member in the aforesaid manner.

14. A trap comprising a frame of an open-topped character and having upstanding front end, rear end, and side portions, a trigger plate disposed horizontally within the lower part of said frame, the rear end portion of said trigger plate being pivotally mounted on said frame and having an upstanding flange the upper portion of which is located approximately vertically above the pivotal mounting of said plate when said plate is in the set position, a latch member pivoted to the rear wall of said frame to swing in a substantially vertical plane, at least a portion of said latch member being located externally of said rear wall, said trigger plate having a projection rearwardly of its pivotal mounting and projecting through an opening in said rear wall to a point in the path of the downswing of said portion of said latch member so that the latter at times moves said trigger plate to its set position, and a spring loaded striker having a swingable arm which as said striker is moved to set position moves said latch member thereby setting the trigger as aforesaid, said trigger thereupon releasably holding said latch member against return movement and at the same time said member releasably holding said striker in set position.

15. The subject matter of claim 14, and said latch member being mounted adjacent to one side of the aforesaid frame and having an end portion which projects beyond said side of the frame into the path of said striker arm.

16. A trap comprising a frame having an upstanding rear end wall, a trigger plate extending lengthwise of the lower part of said frame, the rear end portion of said trigger plate being pivotally mounted on said frame and having an upstanding part located approximately vertically above the pivotal mounting of the plate when the latter is in the set position, a latch plate pivoted between its ends to the rear wall of said frame to swing edgewise in a substantially vertical plane, said latch plate having a bifurcated end portion comprising an upper and a lower arm, said trigger plate having a projection rearward of its pivotal mounting in the path of the downswing of one end portion of said latch plate so that the latter at times moves said trigger plate to its set position, a spring loaded striker having a swingable arm which as said striker is moved to set position engages the lower arm of the aforesaid latch plate bifurcation thereby moving said latch plate and causing it to set said trigger plate as aforesaid, the part of said striker arm which actuates said latch plate being when in set position in an underlying relation to the upper arm of the aforesaid bifurcation so that said upper arm locks the striker in its set position by reason of downswing of the opposite end of said latch member being prevented by the aforesaid upstanding rear part of the trigger plate, said latch plate having a pivot-forming tongue whereby it is pivoted to said rear wall of the frame, said tongue being made of material deflected from the space between the arms of said bifurcation.

17. The subject matter of claim 16, and the upper arm of said bifurcation of said latch plate being shorter than the lower arm thereof to give additional clearance for the downswing of said striker arm.

18. A trap comprising a frame, a baitable trigger mounted upon said frame and releasable by an animal to be trapped, a spring loaded striker consisting of a rectangularly U-shaped rod having its basal portion pivoted to said frame, said frame having low-lying opposite side portions to unobstruct the path of an animal to bait carried by said trigger, latching means releasably to hold said striker in set position, said latching means being operatively connected to said trigger, the arms of said U-shaped striker, when the latter is released from set position, swinging downwardly along paths externally adjacent to said side portions of said frame, and an inverted U-rod having its limbs positioned to internally reinforce the corners of one end of said frame, said reinforcing U-rod having outwardly directed lower end portions positioned to form stops to limit the spring-movement of said striker arms.

19. The subject matter of claim 18, and the spring with which said striker is loaded comprising a wire a portion of which is coiled under tension around the basal run of said striker, said wire having a free end portion insertable under the upper part of said reinforcing U-rod to maintain the coiled portion of the spring under tension.

WILLIAM R. HORNE.

REFERENCES CITED

The following references are of record in the file of this patent:

UNITED STATES PATENTS

| Number | Name | Date |
|---|---|---|
| 2,094,686 | Stilson | Oct. 5, 1937 |

FOREIGN PATENTS

| Number | Country | Date |
|---|---|---|
| 179,305 | Great Britain | May 3, 1922 |